United States Patent
Xiang

(10) Patent No.: US 9,148,009 B2
(45) Date of Patent: Sep. 29, 2015

(54) CHARGER WITH OVER-VOLTAGE AND OVER-CURRENT PROTECTION AND METHOD FOR USING THE SAME

(71) Applicant: Zhiyong Xiang, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 40 days.

(21) Appl. No.: 14/056,633

(22) Filed: Oct. 17, 2013

(65) Prior Publication Data

US 2015/0043117 A1 Feb. 12, 2015

(30) Foreign Application Priority Data

Aug. 9, 2013 (CN) ...................... 2013 2 0488792 U

(51) Int. Cl.
*H02H 3/10* (2006.01)
*H02J 7/00* (2006.01)
*H02H 7/18* (2006.01)
*A24F 47/00* (2006.01)
*H02J 7/04* (2006.01)
*H02M 3/315* (2006.01)

(52) U.S. Cl.
CPC . *H02H 3/10* (2013.01); *H02H 7/18* (2013.01); *H02J 7/0031* (2013.01); *A24F 47/008* (2013.01); *H02J 7/04* (2013.01); *H02J 2007/0039* (2013.01); *H02M 3/315* (2013.01)

(58) Field of Classification Search
CPC ......... A24F 47/008; H02M 3/315; H02J 7/04; H02J 7/0031; H02H 3/10; H02H 7/18
See application file for complete search history.

(56) References Cited

U.S. PATENT DOCUMENTS

| 4,016,480 | A | * | 4/1977 | Hofmann | 323/226 |
| 4,428,016 | A | * | 1/1984 | Brasfield | 361/18 |
| 4,847,720 | A | * | 7/1989 | Dezonno | 361/18 |
| 5,352,969 | A | * | 10/1994 | Gilmore et al. | 320/160 |
| 5,576,611 | A | * | 11/1996 | Yoshida | 320/152 |
| 2011/0273289 | A1 | * | 11/2011 | Tong et al. | 340/540 |
| 2013/0220315 | A1 | * | 8/2013 | Conley et al. | 128/202.21 |

OTHER PUBLICATIONS

SN8P2711 User's Manual, SONIX 8-bit Micro-Controller, Sonix Technology Co., 2004, pp. 1-4.*

* cited by examiner

*Primary Examiner* — Zeev V Kitov
(74) *Attorney, Agent, or Firm* — Locke Lord LLP; Tim Tingkang Xia, Esq.

(57) ABSTRACT

A charger with over-voltage and over-current protection and a method for using the same are provided. The charger comprises a first interface, a second interface, a voltage stabilizing unit, a control unit, an input voltage sampling unit, a switch unit, and a current sampling unit. The voltage stabilizing unit receives an input voltage of an external power supply and provides a constant working voltage to the control unit. The input voltage sampling unit detects the input voltage real-timely. The current sampling unit detects charging current of the battery rod real-timely. The control unit determines whether the input voltage detected by the input voltage sampling unit generates over-voltage or not, or determines whether the charging current detected by the current sampling unit generates over-current or not, and controls the switch unit to turn on or turn off according to the determination results.

13 Claims, 4 Drawing Sheets

US 9,148,009 B2

CHARGER WITH OVER-VOLTAGE AND OVER-CURRENT PROTECTION AND METHOD FOR USING THE SAME

CROSS-REFERENCE TO RELATED APPLICATIONS

This non-provisional application claims priorities under 35 U.S.C. §119(a) on Patent Application No. 201320488792.2 filed in P.R. China on Aug. 9, 2013, the entire contents of which are hereby incorporated by reference.

FIELD OF THE INVENTION

The present invention relates to the field of electronic cigarettes, and more particularly, relates to a charger with over-voltage and over-current protection and a method for using the same.

BACKGROUND OF THE INVENTION

Nowadays, most USB chargers of battery rods of electronic cigarettes on the market are weak in over-voltage protection of input ends of the USB chargers and over-current protection of output ends of the USB chargers.

The weakness of the over-voltage protection of the input ends of the USB chargers is embodied in that a typical USB charger generally has an over-voltage protection capacity of only 6V. An input voltage that is higher than 6V will generate over-voltage, and may further burn the USB charger and a battery rod of an electronic cigarette being charged by the USB charger.

The weakness of the over-current protection of the output ends of the USB chargers is embodied in that: when an output end of a typical USB charger generates over-current or short-circuit, there is no corresponding protection measure applied to the output end, and excessive output current may burn the USB charger.

Some USB chargers on the market even have no over-voltage and over-current protection functions. When a high voltage is applied to an input end of such a USB charger, the USB charger does not limit the over-voltage, and directly transmits the input voltage to an output end of the USB charger. Thus, a battery rod of an electronic cigarette being charged by the USB charger may be burnt. When the output end of the USB charger generates short-circuit, a power supply connected to the USB charger may malfunction or be burnt because of the absence of short-circuit protection.

SUMMARY OF THE INVENTION

The present invention is configured to solve this technical problem: aiming at the defect that a USB charger in the prior art is weak in over-voltage protection of an input end of the USB charger and over-current protection of an output end of the USB charger or even has no over-voltage and over-current protection when the USB charger is used to charge a battery rod, a charger with over-voltage and over-current protection and a method for using the same are provided.

A technical solution of the present invention configured to solve the aforementioned technical problem is that:

In one aspect, a charger with over-voltage and over-current protection is provided and is configured to charge battery rods of electronic cigarettes; the charger with over-voltage and over-current protection includes a first interface configured to connect an external power supply, and a second interface configured to connect the battery rod; the charger with over-voltage and over-current protection further includes a voltage stabilizing unit, a control unit, an input voltage sampling unit, a switch unit, and a current sampling unit. The control unit is connected to the voltage stabilizing unit, the input voltage sampling unit, the current sampling unit, and the switch unit respectively, the first interface is connected to the voltage stabilizing unit, the input voltage sampling unit, and the switch unit respectively, and the second interface is connected to the switch unit and the current sampling unit respectively. The voltage stabilizing unit is configured to receive an input voltage from the external power supply and provide a constant working voltage to the control unit. The input voltage sampling unit is configured to detect the input voltage real-timely. The current sampling unit is configured to detect charging current of the battery rod real-timely. The control unit is configured to determine whether the input voltage detected by the input voltage sampling unit generates over-voltage or not, or determine whether the charging current detected by the current sampling unit generates over-current or not, and control the switch unit to turn on or turn off according to the determination results; the switch unit is configured to receive the input voltage when the switch unit is turned on under the control of the control unit, and output an output voltage to the second interface to charge the battery rod.

In the charger with over-voltage and over-current protection of the present invention, wherein, the control unit includes a microprocessor; and the type of the microprocessor is SN8P2711.

In the charger with over-voltage and over-current protection of the present invention, wherein, the input voltage sampling unit includes a first divider resistor and a second divider resistor; one end of the first divider resistor is connected to a voltage output end of the first interface, another end of the first divider resistor is connected to one end of the second divider resistor and a ninth pin of the microprocessor, and the other end of the second divider resistor is grounded. The input voltage sampling unit further includes a second filtering capacitor, and the second filtering capacitor is connected in parallel with the second divider resistor.

In the charger with over-voltage and over-current protection of the present invention, wherein, the current sampling circuit includes a current sampling resistor, one end of the current sampling resistor is connected to the negative output end of the second interface and a seventh pin of the microprocessor, and the other end of the current sampling resistor is grounded.

In the charger with over-voltage and over-current protection of the present invention, wherein, the switch unit includes a second transistor, a third transistor, a second resistor, and a third resistor; the emitter of the second transistor is connected to the voltage output end of the first interface, the collector of the second transistor is connected to the positive output end of the second interface, and the base of the second transistor is connected to the collector of the third transistor; the base of the third transistor is connected to a fourth pin of the microprocessor via the third resistor, and the emitter of the third transistor is grounded; one end of the second resistor is connected to the base of the second transistor, and the other end of the second resistor is connected to the emitter of the second transistor. The switch unit further includes a fourth filtering capacitor; one end of the fourth filtering capacitor is connected to the collector of the second transistor, and the other end of the fourth filtering capacitor is grounded.

In the charger with over-voltage and over-current protection of the present invention, wherein, the charger further includes an alarming unit; the alarming unit is connected to the voltage stabilizing unit and the control unit respectively; the alarming unit is configured to generate alarming information under control of the control unit when the input voltage generates over-voltage or the charging current generates over-current. The alarming unit includes at least one LED lamp, the cathode of the LED lamp is connected to a sixth pin of the microprocessor, and the anode of the LED lamp is connected to the VDD pin of the microprocessor.

In one embodiment, in the charger with over-voltage and over-current protection of the present invention, wherein, the voltage stabilizing unit includes a three-terminal voltage regulator and a first filtering capacitor; the input terminal of the three-terminal voltage regulator is connected to the voltage output end of the first interface; the output terminal of the three-terminal voltage regulator is connected to the VDD pin of the microprocessor, and the grounding terminal of the three-terminal voltage regulator is connected to the grounding end of the first interface. One end of the first filtering capacitor is connected to the output terminal of the three-terminal voltage regulator, and the other end of the first filtering capacitor is grounded.

In another embodiment, in the charger with over-voltage and over-current protection of the present invention, the voltage stabilizing unit includes a first resistor, a first transistor, a first filtering capacitor, and a voltage stabilizing diode. The collector of the first transistor is connected to the voltage output end of the first interface, the base of the first transistor is connected to the cathode of the voltage stabilizing diode, the anode of the voltage stabilizing diode is grounded, and the emitter of the first transistor is connected to the VDD pin of the microprocessor. One end of the first filtering capacitor is connected to the emitter of the first transistor, and the other end of the first filtering capacitor is grounded; one end of the first resistor is connected to the base of the first transistor, and the other end of the first resistor is connected to the collector of the first transistor.

In a further embodiment, the charger with over-voltage and over-current protection of the present invention further includes an output voltage sampling unit. The output voltage sampling unit is connected to the second interface and the control unit respectively; the output voltage sampling unit is configured to sample the output voltage, and the control unit is further configured to output a PWM signal for adjusting a duty ratio to the switch unit according to the output voltage sampled by the output voltage sampling unit to keep the output voltage constant when the input voltage exceeds a preset voltage. The output voltage sampling unit includes a third divider resistor and a fourth divider resistor; one end of the third divider resistor is connected to the positive output end of the second interface, the other end of the third divider resistor is connected to one end of the fourth divider resistor and an eighth pin of the microprocessor, and the other end of the fourth divider resistor is grounded.

In the charger with over-voltage and over-current protection of the present invention, wherein, the output voltage sampling unit further includes a fifth filtering capacitor and the fifth filtering capacitor is connected in parallel with the fourth divider resistor.

In another aspect, the present invention further provides a method for using a charger with over-voltage and over-current protection, comprising these steps as follows:

S1, when the charger with over-voltage and over-current protection is used to charge a battery rod, using a voltage stabilizing unit of the charger with over-voltage and over-current protection to receive an input voltage of an external power supply and provide a constant working voltage to a control unit of the charger with over-voltage and over-current protection;

S2, using an input voltage sampling unit of the charger with over-voltage and over-current protection to detect the input voltage real-timely, and using a current sampling unit of the charger with over-voltage and over-current protection to detect charging current of the battery rod real-timely;

S3, using the control unit to determine whether the input voltage detected by the input voltage sampling unit generates over-voltage or not, or determine whether the charging current detected by the current sampling unit generates over-current or not, and control a switch unit of the charger with over-voltage and over-current protection to turn on or turn off according to the determination results;

S4, using the switch unit to receive the input voltage when the switch unit is turned on under the control of the control unit, and output an output voltage to a second interface of the charger with over-voltage and over-current protection to charge the battery rod.

In the method of the present invention, wherein, the step S4 further includes: using an alarming unit of the charger with over-voltage and over-current protection to generate alarming information under control of the control unit when the input voltage generates over-voltage or the charging current generates over-current.

In the method of the present invention, wherein, the method further includes these steps: when the battery rod is being normally charged, using an output voltage sampling unit of the charger with over-voltage and over-current protection to sample the output voltage and transmit the output voltage to the control unit, and using the control unit to determine whether the input voltage exceeds a preset voltage; if the input voltage exceeds the preset voltage, the control unit outputs a PWM signal with a regulated duty ratio to the switch unit according to the output voltage sampled by the output voltage sampling unit to keep the output voltage constant.

By implementing the charger with over-voltage and over-current protection and the method for using the same of the present invention, the following advantages can be achieved: the voltage stabilizing unit can continuously provide a constant working voltage to the microcontroller unit; and when the microcontroller unit determines that the input voltage detected by the input voltage sampling unit generates over-voltage or the immediate charging current detected by the current sampling unit generates over-current, the microcontroller unit controls the switch unit to turn off, and thereby stops charging the battery rod to protect the power supply and the battery rod from being burnt or malfunctioning. The present invention further includes an output voltage sampling unit. When the microcontroller determines that the input voltage exceeds a preset voltage, the microcontroller outputs the PWM signal to the switch unit to maintain an output voltage to be constant. The present invention further includes the alarming circuit configured to remind a user when the charger is in above protection situations, and the user can adopt corresponding measures to eliminate possibly hidden dangers according to the reminding information.

DETAILED DESCRIPTION OF THE PREFERRED EMBODIMENT

Figure 1:
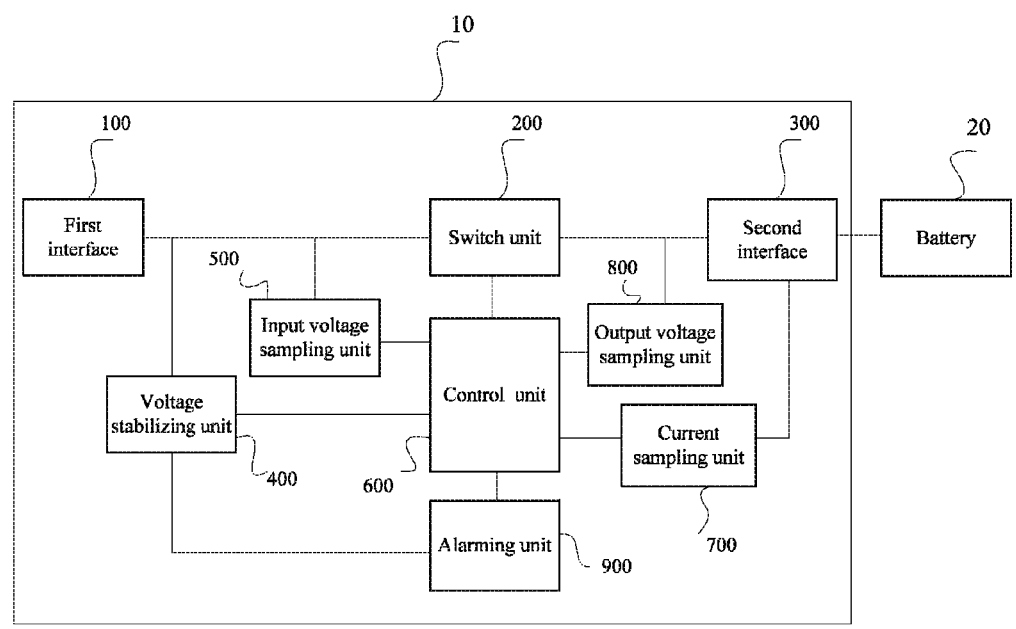
FIG. 1 is a block diagram of an electronic cigarette USB charger with over-voltage and over-current protection of the present invention.

In order to understand the technical features, purpose and the effect of the present invention more clearly, the preferred specific embodiments of the present invention will be described referring to the drawings.

For overcoming the drawback that when a USB charger in the prior art is charging a battery rod, the USB charger is weak in over-voltage protection of an input end thereof and over-current protection of an output end thereof or even has no over-charge protection and over-current protection, the present invention provides a USB charger with over-voltage and over-current protection for electronic cigarettes.

Referring to FIG. 1, which is a block diagram of a USB charger with over-voltage and over-current protection of the present invention.

The USB charger 10 with over-voltage and over-current protection includes a first interface 100, a second interface 300, a voltage stabilizing unit 400, a control unit 600, an input voltage sampling unit 500, a switch unit 200, a current sampling unit 700, an output voltage sampling unit 800, and an alarming unit 900.

The control unit 600 is connected to the voltage stabilizing unit 400, the input voltage sampling unit 500, the current sampling unit 700, and the switch unit 200 respectively. The first interface 100 is connected to the voltage stabilizing unit 400, the input voltage sampling unit 500, and the switch unit 200 respectively. The second interface 300 is connected to the switch unit 200 and the current sampling unit 700 respectively. The alarming unit 900 is connected to the voltage stabilizing unit 400 and the control unit 600 respectively. The output voltage sampling unit 800 is connected to the second interface 300 and the control unit 600 respectively.

The first interface 100 is configured to connect an external power supply.

The second interface 300 is configured to connect a battery 20.

The voltage stabilizing unit 400 is configured to receive an input voltage from the external power supply and provide a constant working voltage to the control unit 600. In this embodiment, a ratio of an input voltage of the voltage stabilizing unit 400 to an output voltage of the voltage stabilizing unit 400 is more than five. In a protection circuit of a USB charger in the prior art, a ratio of an input voltage of the protection circuit to an output voltage of the protection circuit is about one point five. If a high voltage is input to the protection circuit, the protection circuit may be burnt and cannot achieve protection effect. However, in this embodiment, when a high voltage is input to the USB charger with over-voltage and over-current protection, the voltage stabilizing unit 400 can regulate the high voltage, so that the control unit 600 still work normally and can execute the protection function to cut off the high voltage.

The input voltage sampling unit 500 is configured to detect the input voltage real-timely.

The current sampling unit 700 is configured to detect charging current of the battery 20 real-timely.

The output voltage sampling unit 800 is configured to a sample an output voltage of the USB charger 10 with over-voltage and over-current protection real-timely.

The control unit 600 is configured to determine whether the input voltage detected by the input voltage sampling unit 500 generates over-voltage or not, or determine whether the charging current detected by the current sampling unit 700 generates over-current or not, and control the switch unit 200 to turn on or turn off according to the determination results. The control unit 600 is further configured to output a PWM signal for adjusting a duty ratio of the switch unit 200 to the switch 200 unit according to the output voltage sampled by the output voltage sampling unit 800 to keep the output voltage constant when the input voltage exceeds a preset voltage.

The switch unit 200 is configured to turn on under control of the control unit 600, and receive the input voltage and output the output voltage to the second interface 300 to charge the battery 20.

The alarming unit 900 is configured to generate alarming information under control of the control unit 600 when the input voltage generates over-voltage or the charging current generates over-current.

Figure 2:
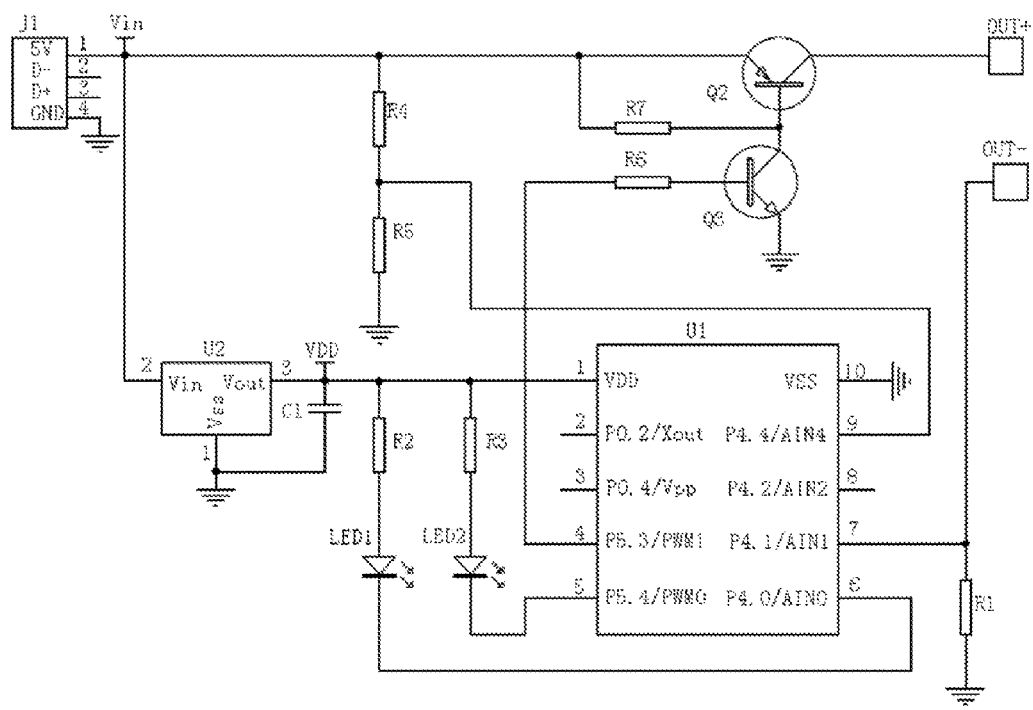
FIG. 2 is a circuit diagram of an electronic cigarette USB charger with over-voltage and over-current protection of a first embodiment of the present invention.

Referring to FIG. 2, which is a circuit diagram of an electronic cigarette USB charger with over-voltage and over-current protection of a first embodiment of the present invention.

In the first embodiment, the first interface 100 is a USB interface J1.

The second interface 300 includes a positive output end OUT+ and a negative output end OUT−.

In the first embodiment, the control unit 600 includes a microprocessor U1, and the type of the microprocessor U1 is SN8P2711. The VDD pin of the microprocessor U1 is configured to receive a working voltage of the microprocessor U1. A fourth pin of the microprocessor U1 is configured to control the switch unit 200 to be turned on and turned off. A fifth pin and a sixth pin of the microprocessor U1 are configured to control the alarming unit 900 to work. A seventh pin of the microprocessor U1 is configured to receive an input signal of the current sampling unit 700. A ninth pin of the microprocessor U1 is configured to receive an input signal of the input voltage sampling unit 500. An eighth pin of the microprocessor U1 is configured to receive an input signal of the output voltage sampling unit 800. In the first embodiment, the output voltage sampling unit 800 is not used; therefore, the eighth pin is floated.

The voltage stabilizing unit 400 includes a three-terminal voltage regulator U2 and a first filtering capacitor C1. The type of the three-terminal voltage regulator U2 can be 78L05, HT7150, HT7550, LM1117, etc. In the first embodiment, the type is preferably 78L05.

Input end Vin of the three-terminal voltage regulator U2 is connected to 5V voltage output end of the USB interface J1. The output end Vout of the three-terminal voltage regulator U2 is connected to the VDD pin of the microprocessor U1 to provide a constant working voltage to the microprocessor U1. In this way, when an output voltage of an external power supply connected to the USB interface J1 generates over-voltage, the microprocessor U1 can still work normally to perform protection measures. The grounding end Vss of the three-terminal voltage regulator U2 is connected to the grounding end of the USB interface J1, and share the grounding end with the external power supply. One end of the first filtering capacitor C1 is connected to the output end Vout of the three-terminal voltage regulator U2, and the other end of the first filtering capacitor C1 is grounded.

By adopting the three-terminal voltage regulator U2, the highest input voltage of the USB charger of the present invention can reach 15V-30V. In the first embodiment, the highest input voltage is 25V.

The input voltage sampling unit 500 includes a first divider resistor R4 and a second divider resistor R5.

One end of the first divider resistor R4 is connected to the 5V voltage input end of the USB interface J1, and the other end of the first resistor R4 is connected to one end of the second divider resistor R5 and the ninth pin of the microprocessor U1. The other end of the second divider resistor R5 is grounded. In the first embodiment, resistances of the first divider resistor R4 and the second divider resistor R5 are respectively 10 KΩ and 2 KΩ.

The first divider resistor R4 and the second divider resistor R5 form a voltage divider circuit. A voltage received by the ninth pin of the microprocessor U1 is actually a voltage drop on the second divider resistor R5. The input voltage of the USB charger with over-voltage and over-current protection can be calculated according to the voltage drop on the second divider resistor R5 and the resistances of the first divider resistor R4 and the second divider resistor R5.

The current sampling unit 700 includes a current sampling resistor R1. One end of the current sampling resistor R1 is connected to the negative output end OUT− of the second interface 300 and the seventh pin of the microprocessor U1, and the other end of the current sampling resistor R1 is grounded. A resistance of the current sampling resistor R1 should be small. In the first embodiment, the resistance of the current sampling resistor R1 is preferably 2.2Ω.

The current sampling resistor R1 samples a voltage drop generated by real-time charging current passing through the current sampling resistor R1 and sends sampling data to the seventh pin of the microprocessor U1. The microprocessor U1 can calculate the real-time charging current according to the voltage drop sampled by the current sampling resistor R1 and the resistance of the current sampling resistor R1.

The switch unit 200 includes a second transistor Q2, a third transistor Q3, a second resistor R7, and a third resistor R6. The second transistor Q2 is a NPN-type transistor, and the third transistor Q3 is a PNP-type transistor.

The emitter of the second transistor Q2 is connected to the 5V voltage output end of the USB interface J1. The collector of the second transistor Q2 is connected to the positive output end OUT+ of the second interface 300. The base of the second transistor Q2 is connected to the collector of the third transistor Q3. The base of the third transistor Q3 is connected to the fourth pin of the microprocessor U1 via the third resistor R6. The emitter of the third transistor Q3 is grounded. One end of the second resistor R7 is connected to the base of the second transistor Q2, and the other end of the second resistor R7 is connected to the emitter of the second transistor Q2.

When the USB charger with over-voltage and over-current protection works normally, the fourth pin of the microprocessor U1 outputs a high electric level signal to the base of the third transistor Q3. The third transistor Q3 is turned on, the base of the second transistor Q2 is grounded, and the second transistor Q2 is turned on too. Thus, the external power supply supplies power to the batter rod directly. Once the microprocessor U1 determines that the input voltage generates over-voltage or the real-time charging current generates over-current, the fourth pin of the microprocessor U1 outputs a low electric level signal to the base of the third transistor Q3. The third transistor Q3 is turned off, the base of the second transistor Q2 is floated, and the second transistor Q2 is turned off too. Thus, the external power supply stops supplying power to the batter rod to protect the external power supply and the battery rod.

The alarming unit 900 includes at least one LED lamp LED1. In the first embodiment, the alarming unit 900 preferably includes two LED lamps LED1 and LED2, and further includes two dropping resistors R2 and R3.

The cathode of the LED lamp LED1 is connected to the sixth pin of the microprocessor U1, and the anode of the LED lamp LED2 is connected to VDD pin of the microprocessor U1 via the dropping resistor R2. Similarly, the cathode of the LED lamp LED2 is connected to the fifth pin of the microprocessor U1, and the anode of the LED lamp LED2 is connected to VDD pin of the microprocessor U1 via the dropping resistor R3.

When the input voltage generates over-voltage or the output current generates over-current, the LED lamps LED1 or LED2 can flicker to remind users the protection situations. Wherein, when the input voltage generates over-voltage, the sixth pin of the microprocessor U1 periodically outputs a low electric level signal, and the LED lamp LED1 can be used to alarm; and when the output current generates over-current, the fifth pin of the microprocessor U1 periodically outputs a low electric level signal, and the LED lamp LED2 can be used to alarm. According to corresponding alarming information, users can check the circuits of the USB charger with over-voltage and over-current protection to remove hidden dangers.

According to the working principles of the above-described units, the protection operations of the whole charging process using the USB charger with over-voltage and over-current protection are as follows.

When the USB charger with over-voltage and over-current protection works normally in the charging process, the output end Vout of the three-terminal voltage regulator U2 outputs a constant working voltage to the VDD pin of the microprocessor U1, and the microprocessor U1 works normally. The current sampling resistor R1 samples the voltage drop generated by the real-time charging current passing through the current sampling resistor R1 and sends the sampling data to the seventh pin of the microprocessor U1. The microprocessor U1 calculates the real-time charging current according to the voltage drop sampled by the current sampling resistor R1. At the same time, the first divider resistor R4 and the second divider resistor R5 form the voltage divider circuit, and the microprocessor U1 calculates the input voltage according to the voltage drop on the second divider resistor R5. The microprocessor U1 determines that the real-time charging current does not generate over-current and the input voltage does not generate over-voltage, and the fourth pin of the microprocessor U1 keeps outputting the high electric level signal to the base of the third transistor Q3. The third transistor Q3 keeps turning on, the base of the second transistor Q2 is grounded, and the second transistor Q2 keeps turning on too. Thus, the external power supply keeps supplying power to the batter rod.

When the input voltage generates over-voltage in the charging process, the output end Vout of the three-terminal voltage regulator still output the constant working voltage to the VDD pin of the microprocessor U1, and the microprocessor U1 keeps working normally. At this time, the microprocessor U1 obtains the real-time charging current and the input voltage by the same method as aforementioned, and determines that the input voltage generates over-voltage. Thus, the fourth pin of the microprocessor U1 outputs the low electric level signal to the base of the third transistor Q3. The third transistor Q3 is turned off, the base of the second transistor Q2 is floated, and the second transistor Q2 is turned off too. Thus, the external power supply stops supplying power to the batter rod. At the same time, the sixth pin of the microprocessor U1 periodically outputs the low electric level signal, and the LED lamp LED1 is driven to flicker and alarm, so that the users know that the input voltage provided by the external power supply generates over-voltage.

When the real-time charging current generates over-current in the charging process, in one aspect, as the method for dealing with the over-voltage situation, the microprocessor U1 controls the third transistor Q3 to turned off, and further turns off the second transistor Q2, so that the external power supply is disconnected from the battery rod and stops supplying power to the battery rod. In another aspect, the fifth pin of the microprocessor U1 periodically outputs the low electric level signal, and the LED lamp LED2 is driven to flicker and alarm, so that the users know that the charging current generates over-current and can further infer that short-circuit may occur.

Figure 3:
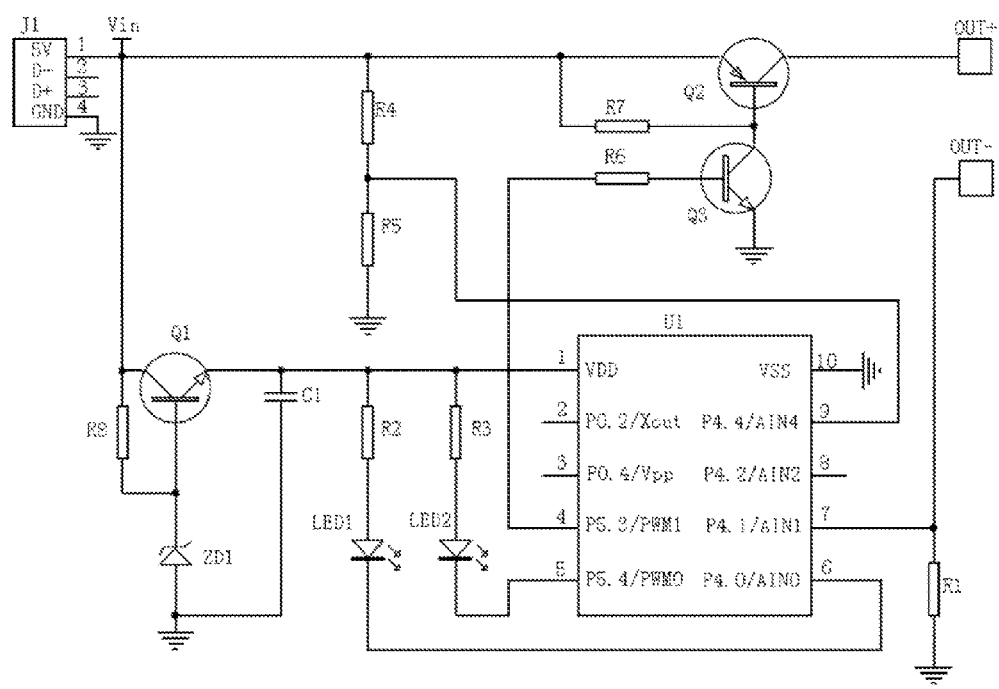
FIG. 3 is a circuit diagram of an electronic cigarette USB charger with over-voltage and over-current protection of a second embodiment of the present invention.

Referring to FIG. 3, which is a circuit diagram of an electronic cigarette USB charger with over-voltage and over-current protection of a second embodiment of the present invention.

The second embodiment differs from the first embodiment in that the voltage stabilizing unit 400 of the second embodiment includes a first resistor R8, a first transistor Q1, a first filtering capacitor C1, and a voltage stabilizing diode ZD1.

The collector of the first transistor Q1 is connected to the 5V voltage output end of the USB interface J1. The base of the first transistor Q1 is connected to the cathode of the voltage stabilizing diode ZD1. The anode of the voltage stabilizing diode ZD1 is grounded. The emitter of the first transistor Q1 is connected to VDD pin of the microprocessor U1.

One end of the first capacitor C1 is connected to the emitter of the first transistor Q1, and the other end of the first capacitor C1 is grounded. One end of the first resistor R8 is connected to the base of the first transistor Q1, and the other end of the first resistor R8 is connected to the collector of the first transistor Q1.

The first transistor Q1 is used as a regulator. The external power supply is connected to the ground via the first resistor R8 and the voltage stabilizing diode ZD1. A voltage on the cathode of the voltage stabilizing diode ZD1 is applied to the base of the first transistor Q1 to turn on the first transistor Q1 and adjust working statuses of the first transistor Q1. In this way, the first transistor Q1 can still output a constant voltage to the VDD pin of the microprocessor U1, so that the microprocessor U1 obtains a constant working voltage.

Figure 4:
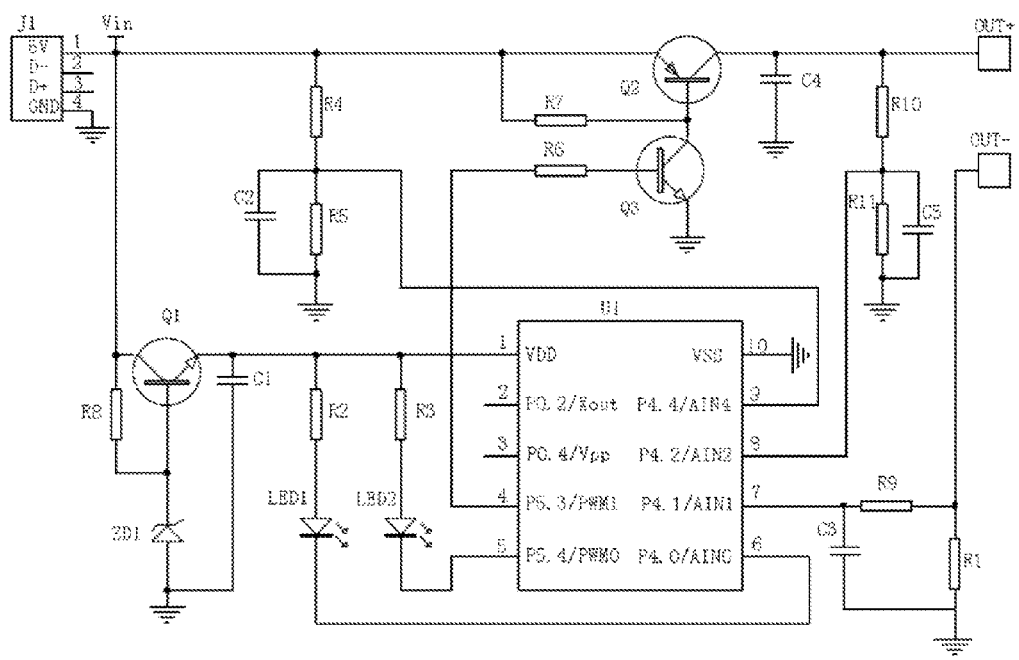
FIG. 4 is a circuit diagram of an electronic cigarette USB charger with over-voltage and over-current protection of a third embodiment of the present invention.

Referring to FIG. 4, which is a circuit diagram of an electronic cigarette USB charger with over-voltage and over-current protection of a third embodiment of the present invention.

Compared with the second embodiment, the third embodiment adds the output voltage sampling unit 800. The output voltage sampling unit 800 includes a third divider resistor R10, a fourth divider resistor R11, a fourth filtering capacitor C4, and a fifth filtering capacitor C5.

One end of the third divider resistor R10 is connected to the positive output end OUT+ of the second interface 300, and the other end of the third divider resistor R10 is connected to one end of the fourth divider resistor R11 and the eighth pin of the microprocessor U1. The other end of the fourth divider resistor R11 is grounded. The fifth filtering capacitor C5 is connected in parallel with the fourth divider resistor R11. One end of the fourth filtering capacitor C4 is connected to the collector of the second transistor Q2, and the other end of the fourth filtering capacitor C4 is grounded.

When the microprocessor U1 determines that the input voltage does not generate over-voltage, but the output voltage exceeds a preset voltage, the microprocessor U1 calculates the output voltage according to a voltage drop on the fourth divider resistor R11 obtained by the eighth pin, and sends a PWM signal to the third transistor Q3. The PWM signal controls the turning-on and turning-off time of the third transistor Q3 and the second transistor Q2 to change until the sampled output voltage is equal to a preset constant voltage.

Furthermore, in the third embodiment, because the fourth pin of the microprocessor U1 needs to output the PWM signal to keep the output voltage of the USB charger with over-voltage and over-current protection being constant when the input voltage exceeds the preset expected voltage, all voltage sampling circuits and current sampling circuits of the third embodiment are equipped with filtering circuits. The input voltage sampling unit 500 further includes a second filtering capacitor C2, and the second filtering capacitor C2 is connected in parallel with the second divider resistor R5. The current sampling unit 700 further includes a filtering circuit comprised of the resistor R9 and the third filtering capacitor C3. Wherein, one end of the resistor R9 is connected to one end of the current sampling resistor R1 and the negative output end OUT− of the second interface 300, and the other end of the resistor R9 is connected to the seventh pin of the microprocessor U1 and one end of the third filtering capacitor C3, and the other end of the third filtering capacitor C3 is grounded.

In conclusion, in the prior art, if the input voltage exceeds the preset expected voltage, the output voltage will rises correspondingly, however, in the third embodiment, the microprocessor U1 can sample the output voltage real-timely using the output voltage sampling unit 800. Once the microprocessor U1 detects that the output voltage exceeds the preset voltage, for keeping the output voltage of the USB charger with over-voltage and over-current protection being still constant, the microprocessor U1 outputs the PWM signal with a regulated duty ratio to the third transistor Q3 according to the output voltage real-timely sampled by the output voltage sampling unit 800, so that the output voltage is kept constant. In this way, when the input voltage does not generate over-voltage but exceeds the preset expect voltage, the output voltage can keep the constant value corresponding to a normal working status and continuously charging the battery rod, and the work of the battery rod is not adversely affected by the too high input voltage.

The present invention further discloses a method for using a USB charger with over-voltage and over-current protection for electronic cigarettes. The method is actually to use the above-described USB charger with over-voltage and over-current protection to charge a battery rod of an electronic cigarette, and includes the steps as follows.

S1, when a USB charger with over-voltage and over-current protection according to any one of above three embodiments (i.e., a USB charger with over-voltage and over-current protection as shown in any one of FIGS. 2 to 4) is used to charge a battery rod, using the voltage stabilizing unit 400 to receive an input voltage from an external power supply and provide a constant working voltage to the control unit 600;

S2, using the input voltage sampling unit 500 to detect the input voltage real-timely, and using the current sampling unit 700 to detect charging current of the battery rod real-timely;

S3, using the control unit 600 to determine whether the input voltage detected by the input voltage sampling unit 500 generates over-voltage or not, or determine whether the charging current detected by the current sampling unit 700 generates over-current or not, and control the switch unit 200 to turn on or turn off according to the determination results;

S4, using the switch unit 200 to receive the input voltage when the switch unit 200 is turned on under the control of the control unit 600, and output an output voltage to the second interface 300 to charge the battery rod.

In one embodiment, the step S4 further includes:

using the alarming unit 900 to generate alarming information under control of the control unit 600 when the input voltage generates over-voltage or the charging current generates over-current.

In one embodiment, the method further includes these steps:

when the battery rod is being normally charged, using an output voltage sampling unit 800 to sample the output voltage and transmit the output voltage to the control unit 600, and using the control unit 600 to determine whether the output voltage exceeds a preset voltage; if the output voltage exceeds the preset voltage, the control unit 600 outputs a PWM signal with a regulated duty ratio to the switch unit 200 according to the output voltage sampled by the output voltage sampling unit 800 to keep the output voltage constant.

While the present invention has been described with the drawings with preferred embodiments which is merely a hint rather than a limit, it will be understood by those skilled in the art that various changes may be made and equivalents may be substituted without departing from the scope of the present invention. But all the changes will be included within the scope of the appended claims.

What is claimed is:

1. A charger with over-voltage and over-current protection configured to charge a battery of an electronic cigarette, comprising: a first interface configured to connect with an external power supply, and a second interface configured to connect with the battery;

wherein the charger with over-voltage and over-current protection further includes a voltage stabilizing unit, a control unit, an input voltage sampling unit, a switch unit, and a current sampling unit;

the control unit is connected to the voltage stabilizing unit, the input voltage sampling unit, the current sampling unit, and the switch unit respectively, the first interface is connected to the voltage stabilizing unit, the input voltage sampling unit, and the switch unit respectively, and the second interface is connected to the switch unit and the current sampling unit respectively;

the voltage stabilizing unit is configured to receive an input voltage of the external power supply and provide a constant working voltage to the control unit;

the input voltage sampling unit is configured to detect the input voltage real-timely;

the current sampling unit is configured to detect charging current of the battery real-timely;

the control unit is configured to determine whether the input voltage detected by the input voltage sampling unit generates over-voltage or not, or determine whether the charging current detected by the current sampling unit generates over-current or not, and control the switch unit to turn on or turn off according to the determination results;

the switch unit is configured to receive the input voltage and output an output voltage to the second interface to charge the battery when the switch unit is turned on under the control of the control unit;

the control unit includes a microprocessor;

the switch unit includes a PNP transistor, an NPN transistor, a second resistor, and a third resistor;

the emitter of the PNP transistor is connected to a voltage output end of the first interface, the collector of the PNP transistor is connected to a positive output end of the second interface, and the base of the PNP transistor is connected to the collector of the NPN transistor; the base of the NPN transistor is connected to a first output of the microprocessor via the third resistor, and the emitter of the NPN transistor is grounded; one end of the second resistor is connected to the base of the PNP transistor, and the other end of the second resistor is connected to the emitter of the PNP transistor.

2. The charger with over-voltage and over-current protection according to claim 1, wherein the charger further includes an alarming unit;

the alarming unit is connected to the voltage stabilizing unit and the control unit respectively;

the alarming unit is configured to generate alarming information under control of the control unit when the input voltage generates over-voltage or the charging current generates over-current.

3. The charger with over-voltage and over-current protection according to claim 1, wherein the charger further includes an output voltage sampling unit;

the output voltage sampling unit is connected to the second interface and the control unit respectively;

the output voltage sampling unit is configured to sample the output voltage, and the control unit is further configured to output a PWM signal for adjusting a duty ratio to the switch unit according to the output voltage sampled by the output voltage sampling unit to keep the output voltage constant when the output voltage exceeds a preset voltage.

4. The charger with over-voltage and over-current protection according to claim 1, wherein the type of the microprocessor is SN8P2711.

5. The charger with over-voltage and over-current protection according to claim 4, wherein the voltage stabilizing unit includes a three-terminal voltage regulator and a first filtering capacitor;

the input terminal of the three-terminal voltage regulator is connected to a voltage output end of the first interface; the output terminal of the three-terminal voltage regulator is connected to VDD pin of the microprocessor, and the grounding terminal of the three-terminal voltage regulator is connected to a grounding end of the first interface;

one end of the first filtering capacitor is connected to the output terminal of the three-terminal voltage regulator, and the other end of the first filtering capacitor is grounded.

6. The charger with over-voltage and over-current protection according to claim 4, wherein the voltage stabilizing unit includes a first resistor, a first transistor, a first filtering capacitor, and a voltage stabilizing diode;

the collector of the first transistor is connected to a voltage output end of the first interface, the base of the first transistor is connected to the cathode of the voltage stabilizing diode, the anode of the voltage stabilizing diode is grounded, and the emitter of the first transistor is connected to the VDD pin of the microprocessor;

one end of the first filtering capacitor is connected to the emitter of the first transistor, and the other end of the first filtering capacitor is grounded; one end of the first resistor is connected to the base of the first transistor, and the other end of the first resistor is connected to the collector of the first transistor.

7. The charger with over-voltage and over-current protection according to claim 4, wherein the input voltage sampling unit includes a first divider resistor and a second divider resistor;
one end of the first divider resistor is connected to a voltage output end of the first interface, the other end of the first divider resistor is connected to one end of the second divider resistor and a first input of the microprocessor; and the other end of the second divider resistor is grounded.

8. The charger with over-voltage and over-current protection according to claim 7, wherein the input voltage sampling unit further includes a second filtering capacitor and the second filtering capacitor is connected in parallel with the second divider resistor.

9. The charger with over-voltage and over-current protection according to claim 4, wherein the current sampling circuit includes a current sampling resistor, one end of the current sampling resistor is connected to a negative output end of the second interface and a second input of the microprocessor, and the other end of the current sampling resistor is grounded.

10. The charger with over-voltage and over-current protection according to claim 1, wherein the switch unit further includes a fourth filtering capacitor;
one end of the fourth filtering capacitor is connected to the collector of the PNP transistor, and the other end of the fourth filtering capacitor is grounded.

11. The charger with over-voltage and over-current protection according to claim 2, wherein the type of the microprocessor is SN8P2711;
the alarming unit includes at least one LED lamp;
the cathode of the LED lamp is connected to a second output of the microprocessor, and the anode of the LED lamp is connected to VDD pin of the microprocessor.

12. The charger with over-voltage and over-current protection according to claim 3, wherein the type of the microprocessor is SN8P2711;
the output voltage sampling unit includes a third divider resistor and a fourth divider resistor;
one end of the third divider resistor is connected to the positive output end of the second interface, the other end of the third divider resistor is connected to one end of the fourth divider resistor and a third input of the microprocessor, and the other end of the fourth divider resistor is grounded.

13. The charger with over-voltage and over-current protection according to claim 12, wherein the output voltage sampling unit further includes a fifth filtering capacitor and the fifth filtering capacitor is connected in parallel with the fourth divider resistor.

* * * * *